United States Patent
Atkinson et al.

(10) Patent No.: US 7,685,139 B2
(45) Date of Patent: Mar. 23, 2010

(54) TRANSLATING AN ORDER'S STOCK KEEPING UNIT HIERARCHY TO AN ORDER FULFILLMENT STRUCTURE

(75) Inventors: Charles Sidney Atkinson, Apex, NC (US); William J. Reilly, Cary, NC (US); William Richard Sadek, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 11/557,219

(22) Filed: Nov. 7, 2006

(65) Prior Publication Data

US 2008/0109463 A1    May 8, 2008

(51) Int. Cl.
    G06F 17/00    (2006.01)
(52) U.S. Cl. ...................................... 707/100
(58) Field of Classification Search .................. 707/100
    See application file for complete search history.

(56) References Cited

U.S. PATENT DOCUMENTS

| | | | |
|---|---|---|---|
| 6,134,557 A * | 10/2000 | Freeman ..................... | 707/102 |
| 6,442,559 B1 * | 8/2002 | Martinsen et al. ........... | 707/102 |
| 6,789,252 B1 | 9/2004 | Burke et al. | |
| 6,866,194 B2 | 3/2005 | Scheurer | |
| 6,898,472 B2 | 5/2005 | Crampton et al. | |
| 2003/0212602 A1 * | 11/2003 | Schaller ....................... | 705/22 |
| 2004/0024662 A1 * | 2/2004 | Gray et al. ................... | 705/29 |
| 2004/0182924 A1 * | 9/2004 | VerEecke et al. ............ | 235/385 |
| 2006/0020366 A1 * | 1/2006 | Bloom ........................ | 700/226 |
| 2006/0116936 A1 * | 6/2006 | Lucas ........................... | 705/28 |

OTHER PUBLICATIONS

Joines, et at.; Supply Chain Multi-Objective Simulation Optimization; Proceedings of the 2002 Winter Simulation Conference; North Carolina State University, Raleigh, NC 27695; pp. 1306-1314.
Sandhu, et al.; Peer-to-Peer Access Control Architecture Using Trusted Computing Technology; SACMAT '05, Jun. 1-3, 2005, Stockholm, Sweden; Copyright 2005 ACM 1-59593-045-0/05/0006; pp. 147-158.

(Continued)

*Primary Examiner*—Pierre M Vital
*Assistant Examiner*—Sabana Rahman
(74) *Attorney, Agent, or Firm*—Schmeiser, Olsen & Watts; John R. Pivnichny

(57) ABSTRACT

A method for translating a stock keeping unit (SKU) hierarchy in a customer order to a type-model-feature (TMF) structure in a vendor's order fulfillment system. A translation table relating the SKU hierarchy and TMF structure is defined. The SKU hierarchy includes SKU numbers that identify a configurable part and configurable options that specify a product. An initial order for the product includes the SKU hierarchy. Using the translation table, the SKU numbers are translated into an instance of the TMF structure. A multi-value characteristic is populated with values that include the SKU numbers and subline identifiers. A second order for the product is created that includes the instance of the TMF structure and subline values associated with the SKU number that identifies the configurable part.

20 Claims, 6 Drawing Sheets

OTHER PUBLICATIONS

Conradi, et al.; Version Models For Software Configuration Management; ACM Computing Surveys, vol. 30, No. 2; Jun. 1998; pp. 232-282.

Siprelle, et al.; Benefits Of Using A Supply Chain Simulation Tool To Study Inventory Allocation; Proceedings of the 2003 Winter Simulation Conference; Simulation Dynamics, 416 High Street, Maryville, TN 37804, USA; pp. 238-245.

Bertrand, et al.; Using hierarchical pseudo bills of material for customer order acceptance and optimal material replenishment in assemble to order manufacturing of non-modular products; Faculty of Technology Management; Eindhoven Univ. of Technol.: Netherlands; International Journal of Production Economics, vol. 66, No. 2; Jun. 2000; pp. 171-184.

* cited by examiner

| Recno | From Date | To Date | SKU | Sold-To | Material | Type | Model | RPQ | Feat | Qty | Segment Indicator | Org | Ch |
|---|---|---|---|---|---|---|---|---|---|---|---|---|---|
| 1 | 11/04/2005 | 12/31/9999 | 74_3563_02 | 21448887 | 8836NEW | | | | | 1 | 01 | 0147 | D |
| 2 | 11/04/2005 | 12/31/9999 | 74_3563_02 | 21448887 | 8836NEW | 8836 | C4X | | | 1 | 01 | 0147 | D |
| 3 | 11/04/2005 | 12/31/9999 | 74_3563_02 | 21448887 | 8836NEW | 8836 | C4X | 845C2X | | 1 | 01 | 0147 | D |
| 4 | 11/15/2005 | 12/31/9999 | 74_3563B02 | 21448887 | 8836NEW | 8836 | C4X | | 4603 | 2 | 02 | 0147 | D |
| 5 | 11/15/2005 | 12/31/9999 | 74_3563C02 | 21448887 | 8836NEW | 8836 | C4X | | 8016 | 1 | 02 | 0147 | D |
| 6 | 11/15/2005 | 12/31/9999 | 74_3563D02 | 21448887 | 8836NEW | 8836 | C4X | | 0232 | 2 | 02 | 0147 | D |
| 7 | 11/04/2005 | 12/31/9999 | 74_3563-01 | 21448887 | X123456 | | | | | 1 | 03 | 0147 | D |
| 8 | 11/15/2005 | 12/31/9999 | 74_3563_02 | 21448887 | X123456 | | | | | | 03 | 0147 | D |

| Item | Material | Order quantity | SU | S | Description | First date | Plnt | ItCa | HgLvlt |
|---|---|---|---|---|---|---|---|---|---|
| 10 | 8836NEW | 1 | EA | ☒ | xSeries 306 xxxx Test | D | 02/16/2006 | 1222 | ZTAC | 0 |
| 20 | 8836C4X | 1 | EA | ☒ | xSeries 306 xxxx Model... | D | 02/16/2006 | 1222 | ZSUP | 10 |
| 30 | X123456 | 3 | EA | ☒ | Single Option SEO | D | 02/16/2006 | 1222 | ZSTK | 0 |
| 40 | 704061D | 3 | EA | ☒ | pSeries I/O Drawer | D | 02/16/2006 | 1222 | ZSUP | 30 |
| 50 | 8836NEW | 1 | EA | ☒ | xSeries 306 xxxx Test | D | 02/16/2006 | 1222 | ZTAC | 0 |
| 60 | 8836C4X | 1 | EA | ☒ | xSeries 306 xxxx Model... | D | 02/16/2006 | 1222 | ZSUP | 50 |
| 70 | 8836NEW | 1 | EA | ☒ | xSeries 306 xxxx Test | D | 02/16/2006 | 1222 | ZTAC | 0 |
| 80 | 8836C4X | 1 | EA | ☒ | xSeries 306 xxxx Model... | D | 02/16/2006 | 1222 | ZSUP | 70 |

| Characteristic Value Assignment | |
|---|---|
| MK_8836_845C2X | 1 |
| MK_8836_845C4X | |
| MK_8836_MOD | C4X |
| MK_8836_8016 | 3 |
| MK_8836_4603 | 6 |
| MK_SUBLINE | FEAT_0232_1001 |
| | FEAT_0232_1003 |
| | FEAT_4603_1004 |
| | FEAT_8016_1002 |
| | FEAT_845C2X_1005 |
| | MOD_8836C4X_1000 |

TRANSLATING AN ORDER'S STOCK KEEPING UNIT HIERARCHY TO AN ORDER FULFILLMENT STRUCTURE

FIELD OF THE INVENTION

The present invention relates to a method and system for translating an order's stock keeping unit hierarchy to an order fulfillment structure, and more particularly to a technique for translating a customer order's stock keeping unit hierarchy to a vendor's type-model-feature nomenclature.

BACKGROUND OF THE INVENTION

Conventional enterprise resource planning (ERP) systems allow a customer information record to be used in inbound order processing and/or standard order creation to present a one-to-one relationship between a non-configurable customer-defined part number and a vendor-defined part number. This conventional technique, however, is not viable if the products are configurable because configurable objects in the customer's variant configuration structure are not associated with configurable objects in the vendor's type-model-feature structure in a one-to-one correspondence. Further, special manufacturing instructions in a customer order can be addressed by known ERP solutions only by inflexible techniques that are cumbersome to develop and maintain. Thus, there exists a need to overcome at least one of the preceding deficiencies and limitations of the related art.

SUMMARY OF THE INVENTION

The present invention provides a computer-based method of translating a stock keeping unit (SKU) hierarchy in a customer order to a type-model-feature structure in a vendor's order fulfillment system, comprising:

defining a multi-value characteristic for carrying multiple values in a free format, each value capable of being any configurable option of one or more configurable options, the defining performed for each type of a plurality of types of configurable products;

defining a table having a table structure identifying a relationship between a SKU hierarchy and a type-model-feature (TMF) structure, the table structure having a hierarchy of configurable features and special manufacturing instructions, and the SKU hierarchy comprising a configurable part and the one or more configurable options;

receiving a first order for a configurable product, the first order including the SKU hierarchy and the configurable product being associated with a type of the plurality of types;

translating SKU values of the configurable part and of the one or more configurable options into an instance of the TMF structure, the translating including utilizing the table;

populating the multi-value characteristic with the one or more configurable options included in the SKU hierarchy included in the first order, the populating including identifying a linkage to the first order via a subline value; and creating a second order for the configurable product, the second order including the instance of the TMF structure.

A system, computer program product, and process for supporting computing infrastructure corresponding to the above-summarized method are also described and claimed herein.

Advantageously, the present invention provides a technique for translating a stock keeping unit hierarchy in a customer order to a type-model-feature structure in a vendor's order fulfillment system where the translation is transparent from the customer's perspective. Logical validations in the translation technique's steps provide efficient processing and high quality translated data and reduce workload.

BRIEF DESCRIPTION OF THE DRAWINGS

FIG. 3 depicts an example of a customer stock keeping unit translation table utilized in the process of FIG. 2, in accordance with embodiments of the present invention.

FIG. 4 depicts an example of an overview of orders created in the vendor's nomenclature in the process of FIG. 2, in accordance with embodiments of the present invention.

FIG. 5 depicts an example of characteristic value assignments for an order of FIG. 4, in accordance with embodiments of the present invention.

DETAILED DESCRIPTION OF THE INVENTION

The present invention supports a vendor's receipt of customers' orders for configurable products in various customer formats, which are different from the vendor's internal configurable product structures (a.k.a. order fulfillment structure or nomenclature). An order's product information (i.e., a configurable part and configurable option(s)) and special manufacturing instructions in the customer's structure is converted into the nomenclature of the vendor's order fulfillment system. The conversion includes a translation of a hierarchy of stock keeping unit (SKU) numbers included in the customer's order to the vendor's nomenclature. The hierarchy of SKU numbers (i.e., SKU hierarchy) identifies the configurable part and the one or more configurable options that comprise the configurable product being ordered. As used herein, a configurable part is defined as a base part of a product to which configurable options may be added during a manufacturing process. The SKU hierarchy translation is transparent from the customer's perspective.

Figure 1:
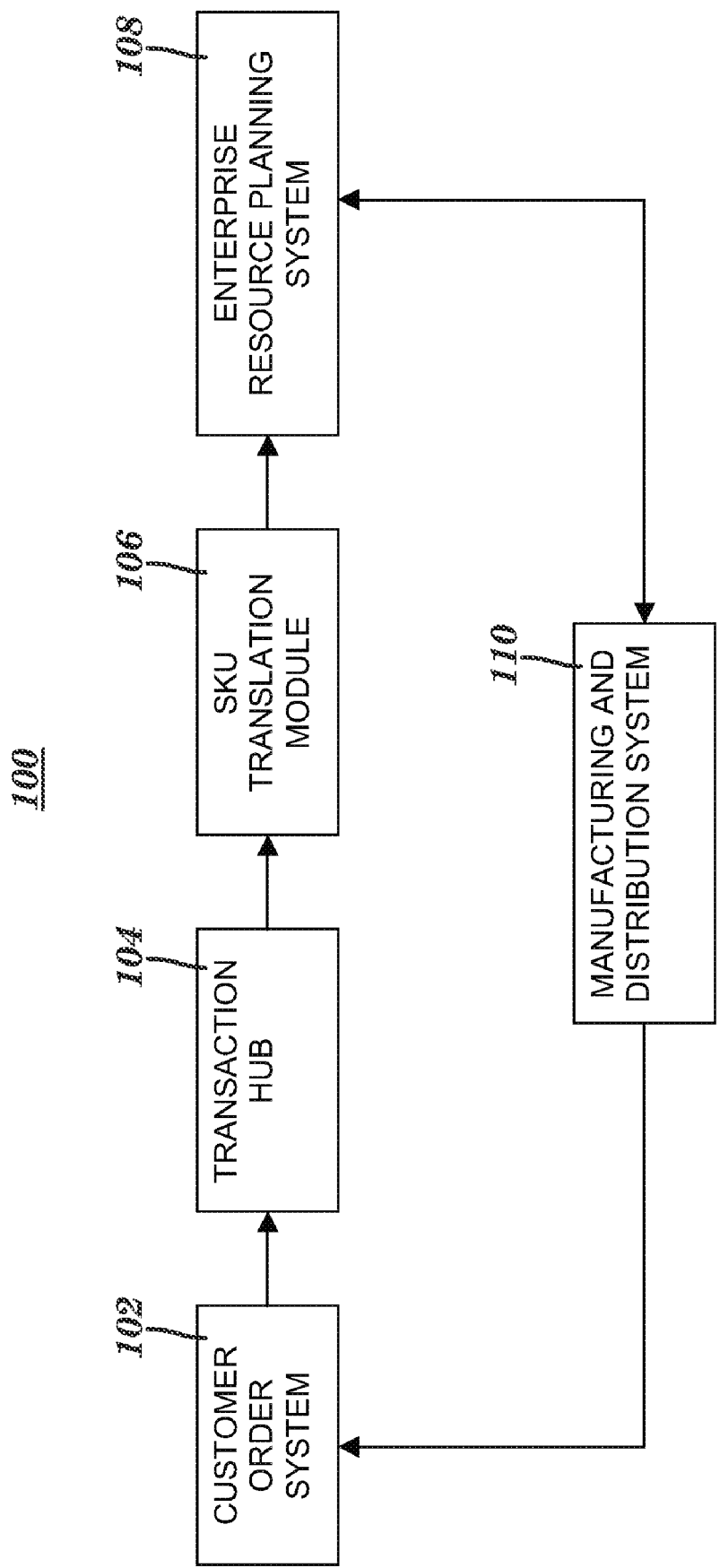
FIG. 1 is a block diagram of a system for translating an order's stock keeping unit hierarchy to a different order fulfillment structure, in accordance with embodiments of the present invention.

FIG. 1 is a block diagram of a system for translating an order's SKU hierarchy to a different order fulfillment structure, in accordance with embodiments of the present invention. A system 100 for translating a SKU hierarchy in a customer's order to a vendor's order fulfillment nomenclature includes a customer order system 102, a transaction hub 104, a SKU translation module 106, an enterprise resource planning system 108 and a manufacturing and distribution system 110. Customer order system 102 dynamically generates an order that includes a SKU hierarchy that identifies a configurable product. The SKU hierarchy includes, for example, a SKU number identifying a base part (e.g., a base model of a personal computer) at one level of the hierarchy. Options (a.k.a. configurable options; e.g., additional memory) to be added to the base part are identified by other SKU numbers, which are children of the base part SKU number in the SKU hierarchy.

Transaction hub 104 receives an order generated at customer order system 102 and re-formats the order. For example, transaction hub 104 converts the order into an electronic data interchange (EDI) document. The re-formatted document retains the SKU hierarchy of the original order. In another embodiment, transaction hub 104 receives orders from multiple customers via multiple customer order systems (not shown).

SKU translation module 106 receives the re-formatted order and utilizes a SKU translation table to translate the SKU hierarchy of the order into a nomenclature that is recognized by the vendor's order fulfillment system. The vendor's nomenclature uses identifiers that are different from the SKU numbers used by the customer order system and that are not all associated with the customer's SKU numbers in a one-to-one correspondence. For example, SKU translation module 106 translates the SKU hierarchy into a type-model-feature (TMF) nomenclature, which identifies any configurable product by codes that identify a material type, a model and a list of one or more features. In some cases, a single SKU number (e.g., part number) in the customer's SKU hierarchy is associated with one or more than one element of the vendor's TMF nomenclature. For example, one part number can be translated into a machine, a model and several features. Further, multiple SKU numbers in the customer's SKU hierarchy can be associated with a different number of multiple elements of the vendor's TMF nomenclature. For instance, five different part numbers in the customer's order translate into a model designation and eight different features in the vendor's nomenclature. The SKU hierarchy translation process is described in more detail below relative to FIG. 2.

Enterprise resource planning system 108 includes the vendor's order fulfillment system. The vendor's order fulfillment system receives the translated order (i.e., in the vendor's nomenclature) from SKU translation module 106 and then sends the translated order to a manufacturing and distribution system 110, which then coordinates the manufacture and distribution of the ordered configurable product.

Figure 2:
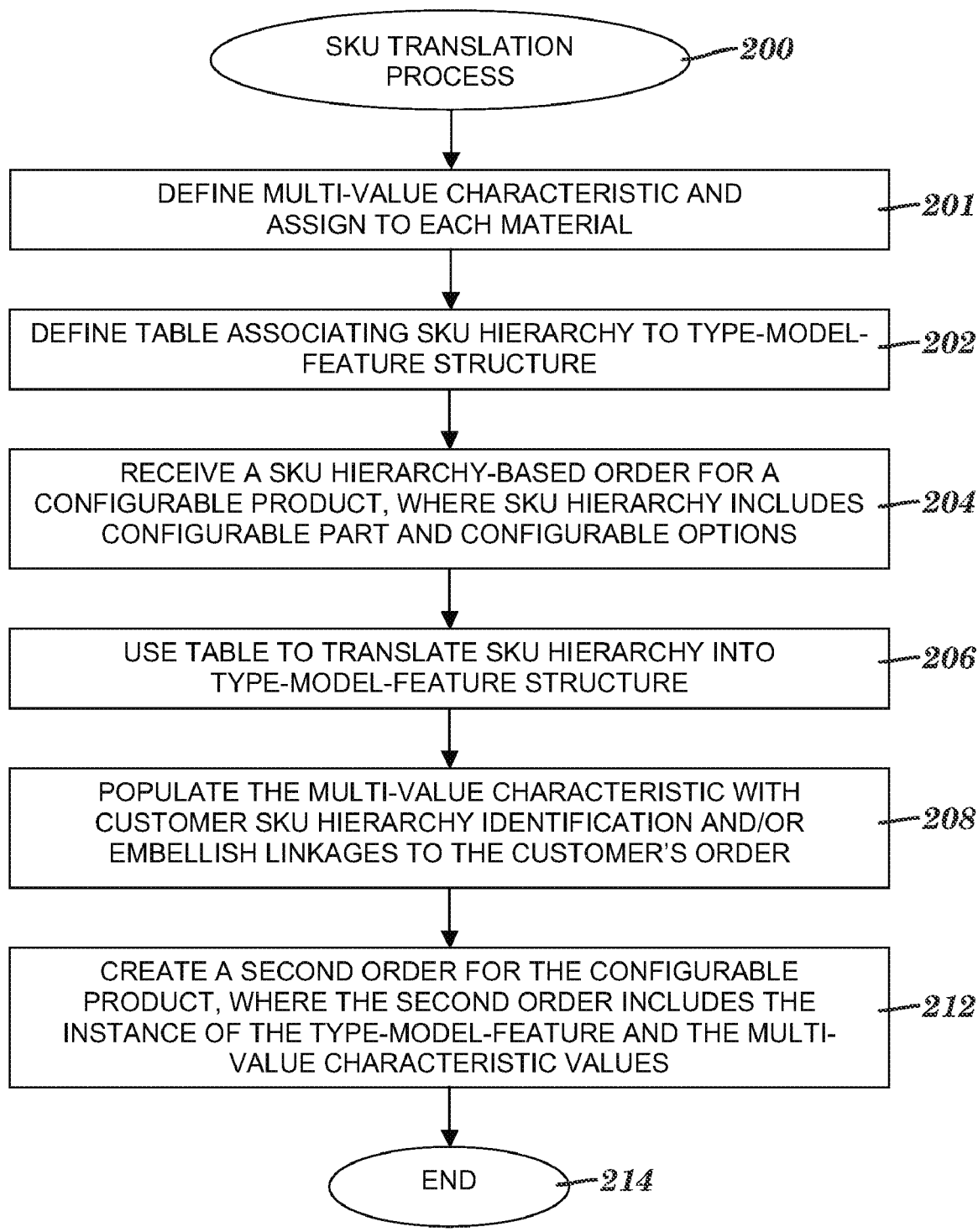
FIG. 2 is a flow diagram of a process of translating an order's stock keeping unit hierarchy to a different order fulfillment structure in the system of FIG. 1, in accordance with embodiments of the present invention.

FIG. 2 is a flow diagram of a process of translating an order's SKU hierarchy to a different order fulfillment structure in the system of FIG. 1, in accordance with embodiments of the present invention. The SKU hierarchy translation process starts at step 200. In step 201, SKU translation module 106 (see FIG. 1) defines a multi-value characteristic for carrying multiple values of configurable options in a free format. Using this one multi-value characteristic facilitates the minimization of product structure impacts for any configurable product. For example, SAP enterprise software offered by SAP AG of Walldorf, Germany provides a MK_CUSMAT characteristic that can carry multiple values. The multiple values carried by MK_CUSMAT include the values of a customer order's SKU hierarchy in a consistent format along with a unique identifier that enables the multi-value characteristic to be linked to the vendor's configurable features and to additional information (e.g., special manufacturing instructions) carried in other fields. This definition step (i.e., step 201) is a one-time set up per material or per type of a plurality of types of configurable products.

In step 202, a SKU translation table is defined. The SKU translation table maps the SKU hierarchy of a customer's order to the vendor's order fulfillment nomenclature that includes configurable items (e.g., TMF structure) and fixed configuration items (e.g., Single Entity Objects (SEOs)). In the TMF structure, for example, is a hierarchy of Machine Type/Model identifiers with configurable features and Request for Price Quotations (RPQs) associated with the machine type/model structure. Configurable features are defined as available elements or components used to build configurable products. Each RPQ is a uniquely identified representation of special manufacturing instructions and/or parts. As used herein, a special manufacturing instruction is defined to be a customized function or a customized feature that is to be added to a base part.

The customer SKU hierarchy includes a customer-defined configurable part and one or more selectable configurable options. A customer can also order parts to be used as replacement parts (a.k.a. spares), which are ordered independent of any configuration.

After mapping the customer's SKU hierarchy to the vendor's order fulfillment structure, a table structure is defined that identifies the customer, the customer SKU hierarchy for configurable products, and any other relevant attributes pertaining to eligibility, such as sales organization and/or distribution channel relationships to the vendor's order fulfillment structure. This table definition occurs, for example, in a SAP Fulfillment engine that uses SAP enterprise software. The domain of a segment indicator field in the table (e.g., field ZZFV_SEGIN) defines the valid data values to be used. For example, the valid values for the segment indicator field can be 01 for a configurable part, 02 for a configurable option, and 03 for a spare or a stand-alone part. The table also includes a delete flag field. If the delete flag field is in an <on> state, then the table entry is considered deleted.

The table defined in step 202 is mapped through interfaces being used for both inputs and outputs. Transaction hub 104 (see FIG. 1) provides a common interface to external documents and translates industry standard documents into a format used by the vendor's order fulfillment system. For example, the transaction hub receives XML standard documents containing manufacturing orders called 7B5 PIPS and translates the XML documents into Intermediate Documents (IDOCs), which are standard SAP document formats for the transfer of business data between SAP applications.

In step 204, SKU translation module 106 (see FIG. 1) receives a customer order for a configurable product, where the order includes a SKU hierarchy and the configurable product being ordered is associated with a type of the aforementioned types of configurable products (see step 201). The SKU hierarchy in the order includes a configurable part and one or more configurable options. The configurable part and the configurable options in an order are each identified by a unique SKU number. The SKU number that identifies the configurable part is an element at the highest level of the SKU hierarchy and the SKU numbers of the configurable options are children of the configurable part SKU number in the hierarchy. In one embodiment, the customer order includes lines of text where each line indicates a SKU number and the lack of indentation or the amount of indentation of each line indicates the level of that line's SKU number in the SKU hierarchy (e.g., a SKU in a line with no indentation is at the highest level of the SKU hierarchy).

In step 206, the table defined in step 202 is used to translate SKU values of the configurable part and the configurable option(s) of the original customer order into an instance of the vendor's order fulfillment structure. For example, SKU values of the SKU hierarchy of the original customer order are translated into a type-model-feature structure used by the vendor's order fulfillment system. Once the IDOC is received by enterprise resource planning system 108 (see FIG. 1), a customer SKU translation table is generated. The use of the customer SKU translation table to perform the translation in step 206 is described in more detail below relative to FIG. 3

In step 208, the multi-value characteristic is populated with the one or more configurable options included in the SKU hierarchy of the customer order. The populating of the multi-value characteristic includes identifying a linkage to the original customer order via a subline value. Subline values are described below in Examples 1 and 2 and in the discussion relative to FIG. 5.

In step 212, a second order for the configurable product is created by the vendor's order fulfillment system in the enterprise resource planning system 108. The second order includes the instance of the vendor's order fulfillment structure generated in steps 206 and 208. For example, a second order created in step 212 includes an instance of a TMF structure into which the original customer order's SKU hierarchy was translated in step 206 and includes the characteristic assignments of the multi-value characteristic assigned in step 208. Following step 212, the SKU translation process ends at step 214.

FIG. 3 depicts an example of a customer SKU translation table 300 utilized in the process of FIG. 2, in accordance with embodiments of the present invention. Any lookup on customer SKU translation table 300 for a model, feature or RPQ invokes the standard nomenclature for the vendor's configurable products, such that an identifier of the multi-value characteristic and a value included in the multi-value characteristic can be derived from the table entry. For example, a lookup of the 0232 entry in the Feat field (i.e., the Feature field) derives the multi-value characteristic of MK_8836_0232 with a minimum value of 1. Assuming that the lookup found a record in the table that matches to the selection criteria and the Qty field has a quantity greater than 1, then the order quantity related to the feature number in the SKU field of table 300 is multiplied by the value of the quantity field (i.e., Qty field) in table 300. The actual value from the IDOC order process is used for feature lookups. As an example of a lookup of an RPQ, a table entry of 845C2X in the RPQ field derives the multi-value characteristic MK_8836_845C2X with a minimum value of 1. The actual quantity value from the IDOC order process is used for features and RPQ lookups. If a value exists in the field, then the order quantity related to the number in the SKU field of table 300 is multiplied by the value of the Qty field in table 300.

Each entry in the SKU translation table must include values in fields corresponding to Sold-to Customer, SKU, Material, Segment Indicator, Sales Organization (e.g., Org field in table 300), Distribution Channel (e.g., Ch field in table 300) and Quantity (e.g., Qty field in table 300). In one embodiment, the Sales Organization and Distribution Channel fields may include a wildcard and the value in the Quantity field must be greater than or equal to 1. In one embodiment, an error message is provided if a user fails to enter the required field values and incomplete entries cannot be saved.

To ensure minimal impact to sales order transaction processing, various logical validations of the data in table 300 are provided. These validations ensure a "hands-off" automated transaction process obtains the most efficient processing, with the highest quality data and a reduction of workload. These validations include: (1) the expected minimum number of entries for a SKU is one if the SKU indicates a SEO and (2) the expected minimum number of entries for a SKU is three if the SKU represents a TMF. In the case of (2), the entries define the material uniquely, the type model uniquely, and the RPQ that represents the customer's basic build of the configurable product being ordered.

EXAMPLE 1

In one embodiment, a predetermined qualifier (e.g., 901) is utilized to point to the table associating the SKU hierarchy of the customer order to the vendor's nomenclature. During the inbound order process where the order being processed includes a customer's material entry having the predetermined qualifier, one of the following sets of actions are taken depending on whether the order transaction is identified as being a configurable part, a configurable option or a spare:

Configurable part: If the transaction is identified as a configurable part, the value of a segment indicator field is set to 01 (i.e., to indicate a configurable part). Table 300 (see FIG. 3) is accessed to collect (1) table line items that are relevant to the Sold-to customer, (2) customer SKU, and (3) all values pertaining to the sales organization and distribution channel. An order line item is populated with the values that pertain to the collected customer SKU. In table 300 (see FIG. 3), the pertinent values include the TMF material of the form xxxxNEW (e.g., 8836NEW in FIG. 3), the table entry for the model (e.g., C4X in FIG. 3), and any RPQs or features indicated by the table (e.g., 845C2X in FIG. 3), with their corresponding quantities.

A characteristic (e.g., MK_CUSMAT) is also populated with the value of MOD_xxxxxxxxxxxxx_zzZZZZ where xxxxxxxxxxxxx is equal to the customer SKU value and zzZZZZ is the value of the subline. Although this populated value may not be used for specific customers, the value will be processed the same generically so that the value will exist if needed. This value will link the model to the customer SKU for TMF products.

Configurable option: If the transaction is identified as a configurable option, the segment indicator field is set to 02. Table 300 (see FIG. 3) is accessed to collect the table line items that are relevant to the Sold-to customer, customer SKU and all values pertaining to the sales organization and distribution channel. An order line is created with the additional RPQs and/or features and their corresponding quantities.

The enhanced sales order processing system translates the SKU to the material, the model characteristic/value, and any RPQ and/or feature characteristics/values. For each RPQ or feature extracted from table 300 (see FIG. 3) for a SKU, transaction hub 104 (see FIG. 1) populates the characteristic MK_CUSMAT with an RPQ/feature identifier such as FEAT_xxxxxxxxxxxxx_yyyy_zzZZZZ, where xxxxxxxxxxxxx is the customer SKU, yyyy is the quantity and zzZZZZ is the subsequent subline identifier.

If the transaction hub determines that a SKU is identified as an option that was sent more than once, the transaction hub populates the characteristic MK_CUSMAT with an identifier such as FTxx_xxxxxxxxxxxxx_yyyy_zzZZZZ, where FTxx identifies a feature (i.e., FT in FTxx) and a sequential numeric value assignment (i.e., xx in FTxx), xxxxxxxxxxxxx is the customer SKU, yyyy is the quantity and zzZZZZ is the subsequent subline identifier.

Spare: If the transaction is identified as a spare, then the segment indicator field is set to 03. Table 300 (see FIG. 3) is accessed to collect the table line items that are relevant to the Sold-to customer, customer SKU, and all values pertaining to the sales organization and distribution channel. An order line item is populated with the values that pertain to that customer SKU. The values populating the order line item are the SEO value from table 300 (see FIG. 3) that meets the criteria.

In Example 1, the last four to six characters in the form zzZZZZ represent the subline value. The characters in the four positions before the rightmost underscore are in the form yyyy and represent the quantity associated with the SKU. The first four characters starting at the left identify the SKU as a feature if the value is FEAT or FTxx. The value of xxxxxxxxxxxxx can vary from one to thirteen alpha-numeric characters. In one embodiment, the up to thirteen alpha-numeric characters may include one or more hyphens and/or underscore characters, but spaces are not allowed. If a specific customer SKU value is repeated within a line item, then the quantity of the associated feature/RPQ must be cumulative (i.e., add the total number of the feature being requested and move the sum to the feature quantity field).

EXAMPLE 2

An order is received in step 204 (see FIG. 2) that includes 74_3563_02, a customer's SKU number for a configured product. In step 208 (see FIG. 2), a multi-value characteristic with identifier MK_CUSMAT is populated with the value MOD_74_3563_02_1000, which is a model value with a subline identifier (i.e., 1000). Using the first row of table 300 (see FIG. 3), the 74_3563_02 SKU is translated in step 206 (see FIG. 2) into the vendor's Material code of 8836NEW. Following the translation step, an order is created in the vendor's nomenclature in step 212 (see FIG. 2). The overview of the order is viewed via enterprise resource planning system 108 (see FIG. 1) in a display that lists items ordered (e.g., configurable products and SEOs). In one embodiment, the enterprise resource planning system displays an overview of orders in a table 400 of FIG. 4. In table 400, the row with item 10 includes the Material code of 8836NEW (i.e., a result of the translation step) and presents the overview of the ordered configured product.

FIG. 5 depicts an example of the second order's configuration 500 that includes the line item details of item 10 in table 400 (see FIG. 4). The quantity value of "1" in the row that includes MK_8836_845C2X in configuration 500 was identified from the table in FIG. 3 from the Qty field. The RPQ is associated with the base part indicated by Material code 8836. That RPQ was not identified in the customer's order distinctly, but was determined by reading the SKU translation table in FIG. 3. Its association from the table in FIG. 3 was made through use of the Segment Indicator "01". This associated RPQ identifies parts that have been designated as standard add-on parts to this particular base part, based on the customer's definition of the base. The row having MK_8836_MOD indicates that C4X is the model value for the configured product being ordered. The next two rows indicate parts 8016 and 4603 that are ordered as configurable options, and their respective quantities 3 and 6 that are used by the vendor's order fulfillment system. The quantities in configuration 500 may be a translation from the quantity included in the original order. For example, a customer that always orders paired memory as a configurable option of a machine may generate an order that indicates each paired memory as a single item, but the vendor may have an order fulfillment system that treats each paired memory as two parts (i.e., the customer's quantity for paired memory is multiplied by two to obtain the vendor's quantity).

The remaining values starting at the row labeled MK_SUBLINE in configuration 500 are sublines. Each subline includes a number from an automatically generated sequence of numbers that links a feature or a type and model to a particular configured product being ordered. For example, in configuration 500, the sequence numbers are four-digit numbers of the form 1xxx (i.e., 1000, . . . , 1005), which are all associated with a single configured product. For another configured product, the associated sublines (not shown) include other sequence numbers (e.g., of the form 2xxx, starting with 2000, 2001, etc.).

The last subline value of configuration 500 (i.e., MOD_8836C4X_1000) includes "MOD" to indicate that the next portion of the value (i.e., 8836C4X) indicates the type (i.e., 8836) and the model (i.e., C4X) of the configured product being ordered. The other subline value in configuration 500 that start with FEAT represent configurable features recognized by the vendor's order fulfillment system. These feature subline values are linked to the original order's SKU number first through the sequence numbers 1001, . . . , 1005, which indicate a relationship to the type model subline value of MOD_8836C4X_1000 (i.e., because the type model subline value includes the first number in the sequence), and then through the second record of table 300 (see FIG. 3) that links the type and model values (i.e., 8836 and C4X, respectively) in the type model subline to the customer SKU number of 74_3563_02.

Enhancement to Translation Process

In one embodiment, the multi-value characteristic defined by the SKU translation process of FIG. 2 is translated in a unique manner to facilitate outbound reporting. There must be at least one table line entry for each customer SKU in the order being processed.

For each order line item whose generation used a customer SKU and values extracted from table 300 (see FIG. 3), additional logic in SKU translation module 106 (see FIG. 1) requires that a customer SKU model characteristic is directly associated to the subline of the model.

For any features or RPQs that were extracted from table 300 (see FIG. 3) as part of the customer SKU for the model, then the code for table conversion adds the feature/RPQ to the configuration with the quantity. In this case, the customer SKU is the same SKU value as the model SKU value.

However, in the case where the configuration section of the IDOC contains multiple entries of the same customer SKU (i.e., the same feature/RPQ listed more than once), the process totals the quantities of the multiple entries since only one representation of the feature/RPQ is included in the vendor's configured product structure. In this case, there is a value of the characteristic MK_CUSMAT that does not have a one-to-one correspondence with a model, feature or RPQ.

For multiple values being associated with the characteristic MK_CUSMAT, each value includes an indicator such as the aforementioned FTxx, followed by the customer SKU, quantity and subline. An example of multiple values associated with MK_CUSMAT is presented below:
    MK_CUSMAT=FT01_74-3564-01_0003_1001
    where MK_SUBLINE=FEAT_8016_1001.
    MK_CUSMAT=FT02_74-3564-01_0001_1002
    where MK_SUBLINE=FEAT_8016_1002.

The check logic on the subline values must be changed to allow more than one subline per feature code or RPQ.

Logic is included to evaluate whether duplicate subline values exist, and if so, to create a line entry in the extract of the SKU translation module 106 (see FIG. 1).

A new field (hereinafter called ZFV_CUS_SKU) has a 13-character length and is described as "Customers SKU". If a model value exists, then the model and all associated features/RPQs in the configuration must have a value for ZFV_CUS_SKU. The additional logic verifies that values in the characteristic MK_CUSMAT which start with FEAT or FTxx are assigned or creates a structure entry for any such value that is not assigned. In addition, another field (hereinafter called ZFV_SKU_QTY) is included to carry the customer SKU quantity that is identified with the MK_CUSMAT characteristic for features/RPQs where that value is moved to the new field. The extracted value for ZFV_SKU_QTY is associated with the FEAT or FTxx value. This association indicates that the quantity of the feature/RPQ shown on the line for a feature can be different from the quantity shown in the ZFV_SKU_QTY field, but the total quantity for all characteristics of FT01_xxxxxxxxxxxxx_yyyy_zzZZZZ that have the same value for xxxxxxxxxxxxx should equal the order quantity of the corresponding feature/RPQ. An example of characteristic values and associated values of ZFV_SKU_QTY is presented below:

FT01__74-3564-01__0003__1001 ZFV_SKU QTY=0003
FT02__74-3564-01__0001__1002 ZFV_SKU QTY=0001

In this example, the order quantity of the feature in the order is 4, but the ZFV_SKU_QTY values are different from each record in the SKU translation module structure.

Examples of this enhanced translation processing with characteristics beginning with MOD, FEAT or FTxx are presented below:

MOD processing: If a value of the characteristic begins with MOD and ends with a subline indicator, the corresponding ZFV_CUS_SKU value is the xxxxxxxxxxxxx value before the subline indicator. For example, if the characteristic value is MOD__74-3563-01__1000, then the ZFV_CUS_SKU value is 74-3563-01 with subline=1000.

FEAT processing: If a value of the characteristic begins with FEAT and ends with a subline indicator, the ZFV_CUS_SKU value is the xxxxxxxxxxxxx value immediately following FEAT_and the ZFV_SKU_QTY value is the yyyy value immediately preceding the underscore that precedes the subline number. For example, if the characteristic value is FEAT__74-3564-01__0003__1001, then the ZFV_CUS_SKU value is 74-3564-01 and the ZFV_SKU_QTY value is 0003. This FEAT processing is used even if the characteristic value is associated with a RPQ.

FTxx processing: If a value of the characteristic begins with FTxx and ends with a subline indicator, the ZFV_CUS_SKU value is the xxxxxxxxxxxxx value immediately following FTxx_and the ZFV_SKU_QTY value is the yyyy value immediately preceding the underscore that precedes the subline number. For example, if the characteristic value is FTxx__74-3564-01__0003__1001, then the ZFV_CUS_SKU value is 74-3564-01 and the ZFV_SKU_QTY value is 0003. This FTxx processing is used even if the characteristic value is associated with a RPQ.

Computing System

Figure 6:
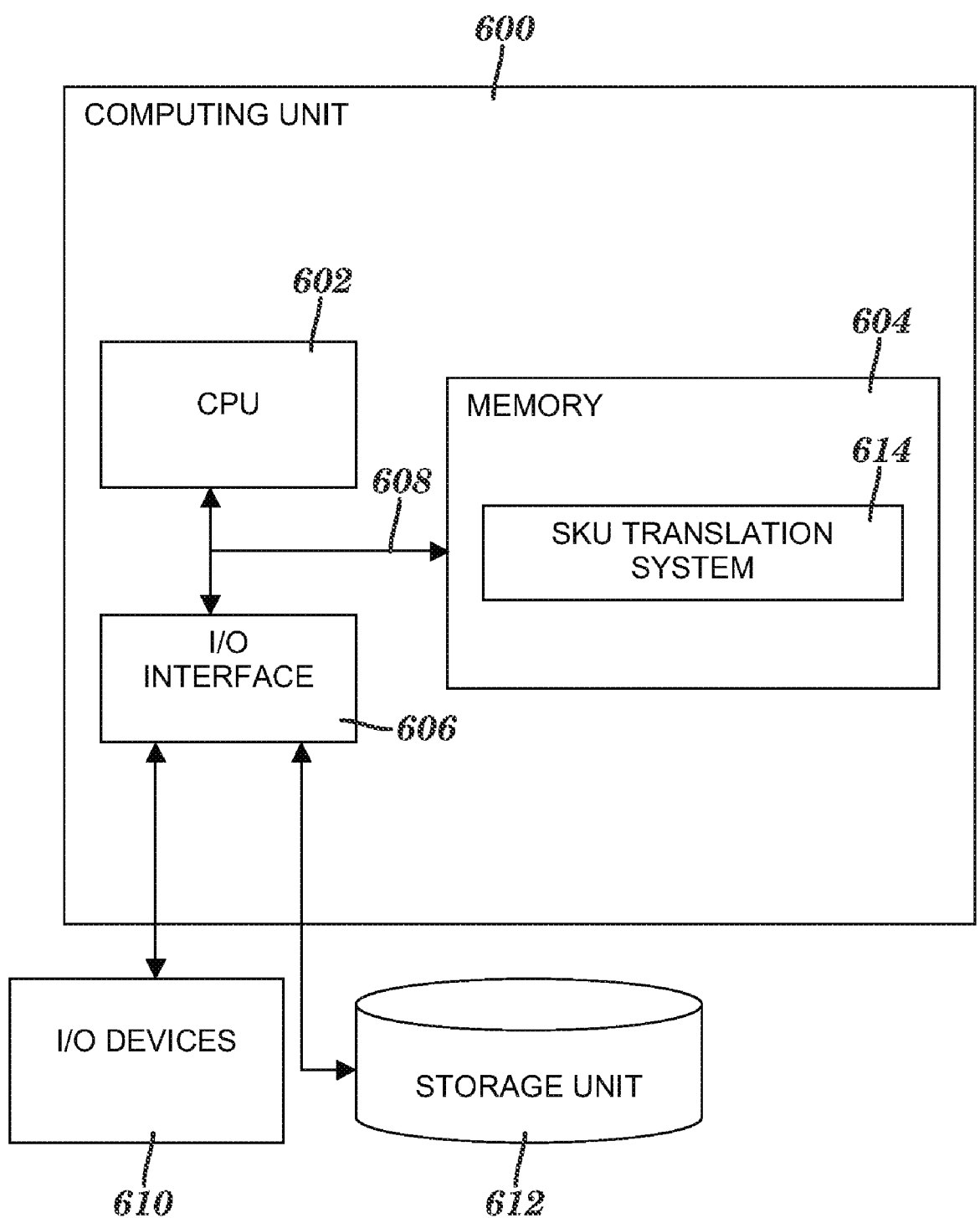
FIG. 6 is a block diagram of a computing system included in the system of FIG. 1, in accordance with embodiments of the present invention.

FIG. 6 is a block diagram of a computing system included in the system of FIG. 1 and that implements the process of FIG. 2, in accordance with embodiments of the present invention. Computing unit 600 generally comprises a central processing unit (CPU) 602, a memory 604, an input/output (I/O) interface 606, a bus 608, I/O devices 610 and a storage unit 612. CPU 602 performs computation and control functions of computing unit 600. CPU 602 may comprise a single processing unit, or be distributed across one or more processing units in one or more locations (e.g., on a client and server).

Memory 604 may comprise any known type of data storage and/or transmission media, including bulk storage, magnetic media, optical media, random access memory (RAM), read-only memory (ROM), a data cache, a data object, etc. Cache memory elements of memory 604 provide temporary storage of at least some program code in order to reduce the number of times code must be retrieved from bulk storage during execution. Moreover, similar to CPU 602, memory 604 may reside at a single physical location, comprising one or more types of data storage, or be distributed across a plurality of physical systems in various forms. Further, memory 604 can include data distributed across, for example, a LAN, WAN or storage area network (SAN) (not shown).

I/O interface 606 comprises any system for exchanging information to or from an external source. I/O devices 610 comprise any known type of external device, including a display monitor, keyboard, mouse, printer, speakers, hand-held device, printer, facsimile, etc. Bus 608 provides a communication link between each of the components in computing unit 600, and may comprise any type of transmission link, including electrical, optical, wireless, etc.

I/O interface 606 also allows computing unit 600 to store and retrieve information (e.g., program instructions or data) from an auxiliary storage device 612. The auxiliary storage device may be a non-volatile storage device such as a magnetic disk drive or an optical disk drive (e.g., a CD-ROM drive which receives a CD-ROM disk). Computing unit 600 can store and retrieve information from other auxiliary storage devices (not shown), which can include a direct access storage device (DASD) (e.g., hard disk or floppy diskette), a magneto-optical disk drive, a tape drive, or a wireless communication device.

Memory 604 includes a SKU translation system 614, which implements steps in the process of FIG. 2. Further, memory 604 may include other systems not shown in FIG. 6, such as an operating system (e.g., Linux) that runs on CPU 602 and provides control of various components within and/or connected to computing unit 600.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of SKU translation system 614 for use by or in connection with a computing unit 600 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 604, ROM, a rigid magnetic disk and an optical disk. Current examples of optical disks include compact disk—read-only memory (CD-ROM), compact disk—read/write (CD-R/W) and DVD.

Any of the components of the present invention can be deployed, managed, serviced, etc. by a service provider that offers to deploy or integrate computing infrastructure with respect to the SKU translation process of the present invention. Thus, the present invention discloses a process for supporting computer infrastructure, comprising integrating, hosting, maintaining and deploying computer-readable code into a computing system (e.g., computing unit 600), wherein the code in combination with the computing system is capable of performing a method of translating a SKU hierarchy.

In another embodiment, the invention provides a business method that performs the process steps of the invention on a subscription, advertising and/or fee basis. That is, a service provider, such as a Solution Integrator, can offer to create, maintain, support, etc. a process of translating a SKU hierarchy of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-based method of translating a stock keeping unit (SKU) hierarchy in a customer order to a type-model-feature structure in a vendor's order fulfillment system, comprising:

defining a multi-value characteristic for carrying multiple values in a free format, wherein said multiple values identify a configurable part and one or more configurable options of said configurable part, wherein said configurable part and said one or more configurable options specify a configurable product of a plurality of configurable products, and wherein said defining said multi-value characteristic is performed for each type of a plurality of types of said plurality of configurable products;

defining a table having a table structure identifying a relationship between a SKU hierarchy and a type-model-feature (TMF) structure of an order fulfillment system of a vendor that supplies said plurality of configurable products, wherein said SKU hierarchy includes a first SKU number that identifies said configurable part and one or more SKU numbers that identify said one or more configurable options, wherein said first SKU number and each SKU number of said one or more SKU numbers are in a parent-to-child relationship in said SKU hierarchy;

receiving a first order for said configurable product, said first order including said first SKU number and said one or more SKU numbers;

translating said first SKU number in said first order to a type of said plurality of types and to a model of said configurable product based on said first SKU number being associated with said type and with said model by said relationship identified by said table structure;

translating said one or more SKU numbers in said first order to one or more features based on said one or more SKU numbers being associated with said one or more features in a one-to-many relationship by said relationship identified by said table structure;

in response to said translating said first SKU number and said translating said one or more SKU numbers, generating an instance of said TMF structure of said order fulfillment system of said vendor, wherein said instance of said TMF structure includes said type, said model, and said one or more features;

populating said multi-value characteristic with a first value included in said multiple values, wherein said first value includes said first SKU number and an initial subline identifier;

populating said multi-value characteristic with one or more other values included in said multiple values, wherein said one or more other values includes said one or more SKU numbers in a one-to-one correspondence, wherein said one or more other values further includes one or more subline identifiers in a one-to-one correspondence, wherein said initial subline identifier and said one or more subline identifiers are included in a sequence of subline identifiers, and wherein said initial subline identifier indicates that said first value is associated with said type and said model based on a position of said initial subline identifier in said sequence of subline identifiers;

creating a second order for said configurable product by a processor of a computing system, wherein said second order includes said instance of said TMF structure and a plurality of subline values, wherein said plurality of subline values includes a first subline value and one or more other subline values, wherein said first subline value includes an identification of said type and said model and further includes said initial subline identifier, wherein said one or more other subline values includes one or more identifications of said one or more features and further includes said one or more subline identifiers, and wherein a result of said creating said second order is a linkage from each subline value of said one or more other subline values to said first SKU number based on said one or more subline identifiers included in said one or more other subline values being included in said sequence of subline identifiers together with said initial subline identifier included in said first subline value, based on said identification of said type and said model included in said first subline value being associated with said type and with said model, and based on said type and said model being associated with said first SKU number by said relationship identified by said table structure.

2. The method of claim 1, further comprising:

setting a segment indicator to a code selected from the group consisting of a first code that indicates said configurable part, a second code that indicates a configurable option of said one or more configurable options, and a third code that indicates a spare part included in said first order; and collecting a plurality of values from said table, said plurality of values indicating a Sold-to customer, a SKU number defined by said Sold-to customer, a sales organization and a distribution channel.

3. The method of claim 2, wherein said code is said first code, and wherein said generating said instance of said TMF structure includes identifying a quantity in said table based on said quantity being included in a record in said table that includes said plurality of values and said first code, wherein said quantity is associated with said type and said model, and wherein said instance of said TMF structure further includes said quantity.

4. The method of claim 2, wherein said code is said first code, wherein said translating said first SKU number includes translating said first SKU number into said type, said model and one or more Request for Price Quotations (RPQs) based on said first SKU number being associated with said type, said model and said one or more RPQs by said relationship identified by said table structure, wherein said one or more RPQs designate one or more standard add-ons to said configurable part, wherein said one or more RPQs are predefined in said table, wherein said generating said instance of said TMF structure includes identifying a quantity in said table based on said quantity being included in a record in said table that includes said plurality of values, said first code, and a RPQ of said one or more RPQs, wherein said quantity is associated with said RPQ, and wherein said instance of said TMF structure further includes said quantity.

5. The method of claim 2, wherein said code is said second code, wherein said generating said instance of said TMF structure includes identifying a quantity in said table based on said quantity being included in a record in said table that includes said plurality of values and said second code, wherein said quantity is associated with said configurable option, and wherein said instance of said TMF structure further includes said quantity.

6. The method of claim 1, wherein said table includes a minimum of three entries associated with said first SKU number of said SKU hierarchy,
wherein a first entry of said three entries uniquely defines a material of said configurable product,
wherein a second entry of said three entries uniquely defines a model of said configurable product,
wherein a third entry of said three entries defines a Request for Price Quotation (RPQ) that designates a standard add-on to said configurable part, and
wherein said RPQ is not included in said first order.

7. A process for supporting computing infrastructure, said process comprising providing at least one support service for at least one of creating, integrating, hosting, maintaining, and deploying computer-readable code in a computing system, wherein the code in combination with the computing system is capable of performing a method of translating a stock keeping unit (SKU) hierarchy in a customer order to a type-model-feature structure in a vendor's order fulfillment system, said method comprising:
defining a multi-value characteristic for carrying multiple values in a free format, wherein said multiple values identify a configurable part and one or more configurable options of said configurable part, wherein said configurable part and said one or more configurable options specify a configurable product of a plurality of configurable products, and wherein said defining said multi-value characteristic is performed for each type of a plurality of types of said plurality of configurable products;
defining a table having a table structure identifying a relationship between a SKU hierarchy and a type-model-feature (TMF) structure of an order fulfillment system of a vendor that supplies said plurality of configurable products, wherein said SKU hierarchy includes a first SKU number that identifies said configurable part and one or more SKU numbers that identify said one or more configurable options, wherein said first SKU number and each SKU number of said one or more SKU numbers are in a parent-to-child relationship in said SKU hierarchy;
receiving a first order for said configurable product, said first order including said first SKU number and said one or more SKU numbers;
translating said first SKU number in said first order to a type of said plurality of types and to a model of said configurable product based on said first SKIJ number being associated with said type and with said model by said relationship identified by said table structure;
translating said one or more SKU numbers in said first order to one or more features based on said one or more SKU numbers being associated with said one or more features in a one-to-many relationship by said relationship identified by said table structure;

in response to said translating said first SKU number and said translating said one or more SKU numbers, generating an instance of said TMF structure of said order fulfillment system of said vendor, wherein said instance of said TMF structure includes said type, said model, and said one or more features;
populating said multi-value characteristic with a first value included in said multiple values, wherein said first value includes said first SKU number and an initial subline identifier;
populating said multi-value characteristic with one or more other values included in said multiple values, wherein said one or more other values includes said one or more SKU numbers in a one-to-one correspondence, wherein said one or more other values further includes one or more subline identifiers in a one-to-one correspondence, wherein said initial subline identifier and said one or more subline identifiers are included in a sequence of subline identifiers, and wherein said initial subline identifier indicates that said first value is associated with said type and said model based on a position of said initial subline identifier in said sequence of subline identifiers;
creating a second order for said configurable product by a processor of said computing system, wherein said second order includes said instance of said TMF structure and a plurality of subline values, wherein said plurality of subline values includes a first subline value and one or more other subline values, wherein said first subline value includes an identification of said type and said model and further includes said initial subline identifier, wherein said one or more other subline values includes one or more identifications of said one or more features and further includes said one or more subline identifiers, and wherein a result of said creating said second order is a linkage from each subline value of said one or more other subline values to said first SKU number based on said one or more subline identifiers included in said one or more other subline values being included in said sequence of subline identifiers together with said initial subline identifier included in said first subline value, based on said identification of said type and said model included in said first subline value being associated with said type and with said model, and based on said type and said model being associated with said first SKU number by said relationship identified by said table structure.

8. The process of claim 7, said method further comprising:
setting a segment indicator to a code selected from the group consisting of a first code that indicates said configurable part, a second code that indicates a configurable option of said one or more configurable options, and a third code that indicates a spare part included in said first order; and
collecting a plurality of values from said table, said plurality of values indicating a Sold-to customer, a SKU number defined by said Sold-to customer, a sales organization and a distribution channel.

9. The process of claim 8, wherein said code is said first code, and wherein said generating said instance of said TMF structure includes identifying a quantity in said table based on said quantity being included in a record in said table that includes said plurality of values and said first code, wherein said quantity is associated with said type and said model, and wherein said instance of said TMF structure further includes said quantity.

10. The process of claim 8, wherein said code is said first code, wherein said translating said first SKU number includes translating said first SKU number into said type, said model and one or more Request for Price Quotations (RPQs) based on said first SKU number being associated with said type, said model and said one or more RPQs by said relationship identified by said table structure, wherein said one or more RPQs designate one or more standard add-ons to said configurable part, wherein said one or more RPQs are predefined in said table, wherein said generating said instance of said TMF structure includes identifying a quantity in said table based on said quantity being included in a record in said table that includes said plurality of values, said first code, and a RPQ of said one or more RPQs, wherein said quantity is associated with said RPQ, and wherein said instance of said TMF structure further includes said quantity.

11. The process of claim 8, wherein said code is said second code, wherein said generating said instance of said TMF structure includes identifying a quantity in said table based on said quantity being included in a record in said table that includes said plurality of values and said second code, wherein said quantity is associated with said configurable option, and wherein said instance of said TMF structure further includes said quantity.

12. The process of claim 7, wherein said table includes a minimum of three entries associated with said first SKU number of said SKU hierarchy,
wherein a first entry of said three entries uniquely defines a material of said configurable product,
wherein a second entry of said three entries uniquely defines a model of said configurable product,
wherein a third entry of said three entries defines a Request for Price Quotation (RPQ) that designates a standard add-on to said configurable part, and
wherein said RPQ is not included in said first order.

13. A computer system comprising:
a processor and a computer-readable memory unit coupled to said processor, said memory unit containing instructions that when executed by said processor implement a method of translating a stock keeping unit (SKU) hierarchy in a customer order to a type-model-feature structure in a vendor's order fulfillment system, said method comprising:
defining a multi-value characteristic for carrying multiple values in a free format, wherein said multiple values identify a configurable part and one or more configurable options of said configurable part, wherein said configurable part and said one or more configurable options specify a configurable product of a plurality of configurable products, and wherein said defining said multi-value characteristic is performed for each type of a plurality of types of said plurality of configurable products;
defining a table having a table structure identifying a relationship between a SKU hierarchy and a type-model-feature (TMF) structure of an order fulfillment system of a vendor that supplies said plurality of configurable products, wherein said SKU hierarchy includes a first SKU number that identifies said configurable part and one or more SKU numbers that identify said one or more configurable options, wherein said first SKU number and each SKU number of said one or more SKU numbers are in a parent-to-child relationship in said SKU hierarchy;
receiving a first order for said configurable product, said first order including said first SKU number and said one or more SKU numbers;
translating said first SKU number in said first order to a type of said plurality of types and to a model of said configurable product based on said first SKU number being associated with said type and with said model by said relationship identified by said table structure;
translating said one or more SKU numbers in said first order to one or more features based on said one or more SKU numbers being associated with said one or more features in a one-to-many relationship by said relationship identified by said table structure;
in response to said translating said first SKU number and said translating said one or more SKU numbers, generating an instance of said TMF structure of said order fulfillment system of said vendor, wherein said instance of said TMF structure that includes said type, said model, and said one or more features;
populating said multi-value characteristic with a first value included in said multiple values, wherein said first value includes said first SKU number and an initial subline identifier;
populating said multi-value characteristic with one or more other values included in said multiple values, wherein said one or more other values includes said one or more SKU numbers in a one-to-one correspondence, wherein said one or more other values further includes one or more subline identifiers in a one-to-one correspondence, wherein said initial subline identifier and said one or more subline identifiers are included in a sequence of subline identifiers, and wherein said initial subline identifier indicates that said first value is associated with said type and said model based on a position of said initial subline identifier in said sequence of subline identifiers;
creating a second order for said configurable product, wherein said second order includes said instance of said TMF structure and a plurality of subline values, wherein said plurality of subline values includes a first subline value and one or more other subline values, wherein said first subline value includes an identification of said type and said model and further includes said initial subline identifier, wherein said one or more other subline values includes one or more identifications of said one or more features and further includes said one or more subline identifiers, and wherein a result of said creating said second order is a linkage from each subline value of said one or more other subline values to said first SKU number based on said one or more subline identifiers included in said one or more other subline values being included in said sequence of subline identifiers together with said initial subline identifier included in said first subline value, based on said identification of said type and said model included in said first subline value being associated with said type and with said model, and based on said type and said model being associated with said first SKU number by said relationship identified by said table structure.

14. The system of claim 13, wherein said method further comprises:
setting a segment indicator to a code selected from the group consisting of a first code that indicates said configurable part, a second code that indicates a configurable option of said one or more configurable options, and a third code that indicates a spare part included in said first order; and
collecting a plurality of values from said table, said plurality of values indicating a Sold-to customer, a SKU number defined by said Sold-to customer, a sales organization and a distribution channel.

15. The system of claim 14, wherein said code is said first code, and wherein said generating said instance of said TMF structure includes identifying a quantity in said table based on said quantity being included in a record in said table that includes said plurality of values and said first code, wherein said quantity is associated with said type and said model, and wherein said instance of said TMF structure further includes said quantity.

16. The system of claim 14, wherein said code is said first code, wherein said translating said first SKU number includes translating said first SKU number into said type, said model and one or more Request for Price Quotations (RPQs) based on said first SKU number being associated with said type, said model and said one or more RPQs by said relationship identified by said table structure, wherein said one or more RPQs designate one or more standard add-ons to said configurable part, wherein said one or more RPQs are predefined in said table, wherein said generating said instance of said TMF structure includes identifying a quantity in said table based on said quantity being included in a record in said table that includes said plurality of values, said first code, and a RPQ of said one or more RPQs, wherein said quantity is associated with said RPQ, and wherein said instance of said TMF structure further includes said quantity.

17. A computer program product, comprising:
a computer-readable storage medium having a computer-readable program code stored therein, said computer-readable program code containing instructions configured to be executed by a processor of a computer system to implement a method of translating a stock keeping unit (SKU) hierarchy in a customer order to a type-model-feature structure in a vendor's order fulfillment system, said method comprising:
defining a multi-value characteristic for carrying multiple values in a free format, wherein said multiple values identify a configurable part and one or more configurable options of said configurable part, wherein said configurable part and said one or more configurable options specify a configurable product of a plurality of configurable products, and wherein said defining said multi-value characteristic is performed for each type of a plurality of types of said plurality of configurable products;
defining a table having a table structure identifying a relationship between a SKU hierarchy and a type-model-feature (TMF) structure of an order fulfillment system of a vendor that supplies said plurality of configurable products, wherein said SKU hierarchy includes a first SKU number that identifies said configurable part and one or more SKU numbers that identify said one or more configurable options, wherein said first SKU number and each SKU number of said one or more SKU numbers are in a parent-to-child relationship in said SKU hierarchy;
receiving a first order for said configurable product, said first order including said first SKU number and said one or more SKU numbers;
translating said first SKU number in said first order to a type of said plurality of types and to a model of said configurable product based on said first SKU number being associated with said type and with said model by said relationship identified by said table structure;
translating said one or more SKU numbers in said first order to one or more features based on said one or more SKU numbers being associated with said one or more features in a one-to-many relationship by said relationship identified by said table structure;
in response to said translating said first SKU number and said translating said one or more SKU numbers, generating an instance of said TMF structure of said order fulfillment system of said vendor, wherein said instance of said TMF structure that includes said type, said model, and said one or more features;
populating said multi-value characteristic with a first value included in said multiple values, wherein said first value includes said first SKU number and an initial subline identifier;
populating said multi-value characteristic with one or more other values included in said multiple values, wherein said one or more other values includes said one or more SKU numbers in a one-to-one correspondence, wherein said one or more other values further includes one or more subline identifiers in a one-to-one correspondence, wherein said initial subline identifier and said one or more subline identifiers are included in a sequence of subline identifiers, and wherein said initial subline identifier indicates that said first value is associated with said type and said model based on a position of said initial subline identifier in said sequence of subline identifiers;
creating a second order for said configurable product, wherein said second order includes said instance of said TMF structure and a plurality of subline values, wherein said plurality of subline values includes a first subline value and one or more other subline values, wherein said first subline value includes an identification of said type and said model and further includes said initial subline identifier, wherein said one or more other subline values includes one or more identifications of said one or more features and further includes said one or more subline identifiers, and wherein a result of said creating said second order is a linkage from each subline value of said one or more other subline values to said first SKU number based on said one or more subline identifiers included in said one or more other subline values being included in said sequence of subline identifiers together with said initial subline identifier included in said first subline value, based on said identification of said type and said model included in said first subline value being associated with said type and with said model, and based on said type and said model being associated with said first SKU number by said relationship identified by said table structure.

18. The program product of claim 17, wherein said method further comprises:
setting a segment indicator to a code selected from the group consisting of a first code that indicates said configurable part, a second code that indicates a configurable option of said one or more configurable options, and a third code that indicates a spare part included in said first order; and
collecting a plurality of values from said table, said plurality of values indicating a Sold-to customer, a SKU number defined by said Sold-to customer, a sales organization and a distribution channel.

19. The program product of claim 18, wherein said code is said first code, and wherein said generating said instance of said TMF structure includes identifying a quantity in said table based on said quantity being included in a record in said table that includes said plurality of values and said first code, wherein said quantity is associated with said type and said model, and wherein said instance of said TMF structure further includes said quantity.

20. The program product of claim 18, wherein said code is said first code, wherein said translating said first SKU number includes translating said first SKU number into said type, said model and one or more Request for Price Quotations (RPQs) based on said first SKU number being associated with said type, said model and said one or more RPQs by said relationship identified by said table structure, wherein said one or more RPQs designate one or more standard add-ons to said configurable part, wherein said one or more RPQs are pre-defined in said table, wherein said generating said instance of said TMF structure includes identifying a quantity in said table based on said quantity being included in a record in said table that includes said plurality of values, said first code, and a RPQ of said one or more RPQs, wherein said quantity is associated with said RPQ, and wherein said instance of said TMF structure further includes said quantity.

* * * * *